United States Patent [19]

Boyd

[11] Patent Number: 4,467,825

[45] Date of Patent: Aug. 28, 1984

[54] SHUTTLE VALVE ASSEMBLY

[75] Inventor: Andrew B. Boyd, Houston, Tex.

[73] Assignee: The Andy Boyd Company, Houston, Tex.

[21] Appl. No.: 458,201

[22] Filed: Jan. 17, 1983

[51] Int. Cl.3 .............................................. F16K 11/10

[52] U.S. Cl. .................................................... 137/112

[58] Field of Search .................... 137/112, 111; 91/32, 91/33; 92/62

[56] References Cited

U.S. PATENT DOCUMENTS 4,249,557 2/1981 Habiger .............................. 137/112

FOREIGN PATENT DOCUMENTS 811485 4/1959 United Kingdom .................... 92/62

*Primary Examiner*—Martin P. Schwadron
*Assistant Examiner*—James R. Shay
*Attorney, Agent, or Firm*—Vaden, Eickenroht, Thompson, Bednar & Jamison

[57] ABSTRACT

A shuttle valve assembly formed with a body having a plurality of nesting housings, an outlet end housing with a fluid signal outlet and a closed end housing. These housings have an aligned axial passageway containing a plurality of tubular spool valve members which are adapted to move axially between opened and closed positions therein individually and in a nested arrangement. Each of the housings has an inlet signal port in communication with the passageway. The nested valve members are moved toward the closed end housing by a primary fluid signal applied to the inlet port on the closed end housing with the primary signal passing to the outlet. A superior fluid signal applied to the inlet port of one of the nested housings, causes the valve member closer to the closed end housing to separate from the remaining nested valve members. As a result this superior signal appears at the outlet. Conversely, the nested valve members are moved toward the outlet end housing by superior fluid signal being applied to the inlet signal port in the closed end housing so that the superior fluid signal appears at the outlet.

In a preferred embodiment, the nested housing and spool valve members are identical and may be stacked in any number between the end housings so as to provide multiple input control requirements for the shuttle valve in operation of blowout preventer stacks or the like.

14 Claims, 1 Drawing Figure

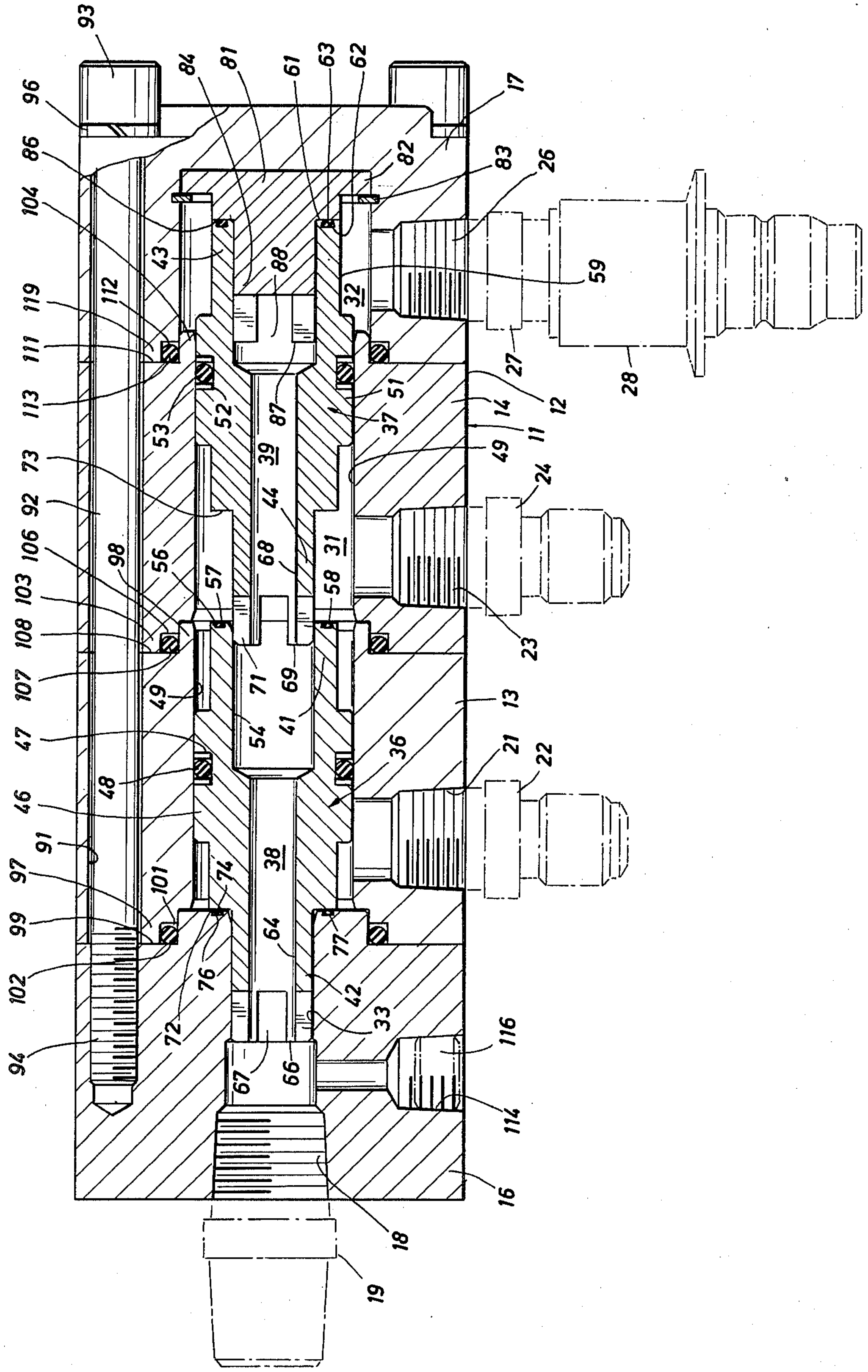
93
96
86
104
119
111
113
112
84
81
61
63
62
17
82
83
26
43
88
59
32
27
28
53
52
87
51
37
12
14
11
49
39
73
92
106
103
108
107
98
56
57
44
68
31
58
24
23
71
69
49
54
41
13
47
48
46
36
21
22
91
97
99
102
101
74
38
64
77
76
72
42
33
94
67
66
116
114
18
16
19

SHUTTLE VALVE ASSEMBLY

BACKGROUND OF THE INVENTION

1. Field of the Invention

This invention relates to valve and valve actuators, and more particularly it relates to a multiinput control shuttle valve assembly readily arranged for any desired number of separate inputs in its controlling function.

2. Description of Prior Art

In oil field practices, it is conventional to employ shuttle valves for the remote controlling of fluid actuated drilling and production devices, such as blowout preventer stacks. The conventional shuttle valve is a three port device having two inputs and one output, wherein each input is exclusive in function of the other input. These shuttle valves are relatively efficient when it is necessary to control a fluid actuated unit such as a blowout preventer stack from only two inputs fluid signals. However, it is now a requirement that certain blowout preventer stack be also adapted for actuation by acoustic control mechanisms. For example, the blowout preventer stacks must be adapted for operation with acoustic control systems so that if the conventional inputs from the surface to the shuttle valve are interrupted, an acoustic generator can be dropped adjacent the wellhead and the acoustic sensing valve supplied by a hydraulic accummulator applies hydraulic pressure to one input of the shuttle valve for operating the blowout preventor stack as now required by federal regulations.

It will be apparent that with the conventional shuttle valve with only two inputs the acoustic control regulations cannot be directly met since there is no additional input for the acoustic control system. Attempts have been made to comply with the acoustic control regulations, through the ganging of the conventional dual input shuttle valves. However, this situation has led to complex piping systems which in and of themselves lead to additional non-failsafe problems with blowout preventer arrangements such as employed on sea floor well templates.

The present invention is a shuttle valve to solve the multiinput requirements of drilling and production units such as blowout preventer stacks, where the shuttle valve arrangement can be adapted to accommodate any desired number of inputs in a convenient manufacturing and construction practice.

SUMMARY OF THE INVENTION

In accordance with this invention, there is provided a shuttle valve assembly having a common output that can accommodate a plurality of inputs in a simple expanded numerical arrangement for any desired control situation. More particularly, the shuttle valve assembly is comprised of a body having a plurality of nested housings, an outlet end housing having a fluid signal outlet and a closed end housing. Means are provided for securing these housings into a integrated body structure. The housings have an aligned axial passageway in which are mounted a plurality of spool valve members. These valve members have a central passageway opening into the outlet and they can move axially between several positions in the body. The valve members can move individually or in a nested arrangement depending upon the placement of input fluid signals. Each housing has an inlet signal port in communication with the passageway in the body. The valve members are moved into a nested arrangement towards the outlet end housing by a primary fluid signal applied at the inlet port on the closed end housing. As a result, the primary signal passes directly to the outlet. Each of the valve members can be separated from the valve member next closer to the closed end housing by a superior fluid signal being applied to the inlet signal port on the nested housing containing the valve member being separated. As a result, this signal passes through the in place valve members and appears out the outlet. A superior fluid signal moves all the spool valve members towards the closed end housing and passes through them to the outlet. For each additional input fluid signal control function, it is only necessary to add a nested housing and spool valve member to the body to accommodate such increased input control function for the shuttle valve assembly.

DESCRIPTION OF THE DRAWINGS

FIG. 1 illustrates a three input shuttle valve assembly of one embodiment of the present invention taken in section along the axial passageway therein.

DESCRIPTION OF PREFERRED EMBODIMENTS

Referring to the drawings, there is shown a preferred embodiment of a shuttle valve assembly 11 which is arranged to have three fluid input signal capabilities with a common fluid signal outlet. This shuttle valve assembly 11 is especially suited for use in controlling a subsea blowout preventer stack by employing two of the input fluid signals as originating from a surface disposed drilling rig whereas the third input fluid signal can be either an emergency manual control or a subsea acoustic control function of the type required by national federal acoustic control regulations as they relate to the oil drilling and production industry.

In this particular embodiment, the shuttle valve assembly has a body 12 formed of a plurality of nested housings 13 and 14, an outlet end housing 16 and a closed end housing 17. The outlet end housing 16 has an outlet 18 which may be connected to an exterior output conduit by a connector 19 threadedly mounted in the housing 16. The housing 13 carries a inlet signal port 21 to which access may be provided by a connector 22 threaded into the housing 13. In like fashion, the housing 14 has an inlet signal port 23 to which access may be provided by a connector 24 threaded mounted within the housing 14. Also, the closed end housing 17 has an inlet signal port 26 to which access may be provided by a connector 27 threaded into the housing 17.

More particularly, the connector 27 can be associated with the output signal line of a sub sea acoustic control unit which contains hydraulic fluid under suitable pressure for actuating the shuttle valve assembly 11. However, the connector 27 could be connected to a manual fluid signal source such as a rig mounted hydraulic accumulator with an emergency valve for admitting hydraulic pressure to the inlet port 26.

The housings are provided with a cylindrical passageway 31 which has a substantially uniform bore through the housings 13 and 14, an enlarged cylindrical portion 32 within the end housing 17 and a reduced cylindrical portion 33 within the outlet end housing 16. Within these cylindrical passageways are mounted for sliding axial movement, a plurality of tubular spool valve members 36 and 37. As will be apparent from the following description, these valve members are slideably mounted within the passageways in the housings so that they can move individually or in a nested arrangement between opened and closed positions within the body 12. More particularly, the valve members 36 and 37 have central outlet passageways 38 and 39 respectively, connected with the outlet 18. Depending upon their open-closed valve function, a inlet fluid signal can be conducted through each or all of these valve members and then to the outlet 18 in the housing 16.

More particularly, the preferred arrangement is that the valve members 36 and 37 have identical constructions. Likewise the housings 13 and 14 have identical construction in the shuttle valve assembly 11. The spool valve members 36 and 37 are constructed for a special cooperation with the nested housings 13 and 14, and end housings 16 and 17 to achieve this purpose. More specifically, the valve member 36 has a sealing end 41 and a porting end 42. The valve member 36 has a cylindrical body portion 46 which is provided with an annular groove 47 in which is mounted a resilient sealing ring 48 to provide a fluid tight seal in sliding contact with the cylindrical sidewall 49 of the passageway 31 formed within the housings 13 and 14. Likewise, the spool valve member 37 has a sealing end 43 and a porting end 44. It has a cylindrical body portion 51 in which is provided an annular groove 52 for carrying a resilient sealing ring 53 in fluid-tight sliding contact with the cylindrical surface 49 formed within the housing 14 about the passageway 31.

In addition, on the valve member 36, the sealing end 41 is provided by an annular projection 54 which has a flat end 56 that is provided with an annular groove 57 in which is dovetailed a resilient sealing ring 58. Likewise, the valve member 37 has an annular projection 59 which terminates in a flat end surface 61 having formed therein an annular dovetailed groove in which is received a resilient sealing ring 63.

The valve member 36 has the porting end 42 formed by an annular projection 64 which extends to a flat end 66. One or more fluid openings or slots 67 are provided which extend from the flat end 66 axially into the annular projection 64. The axial dimension of these openings 67 determine whether the spool valve members operate in a closed or opened fluid circuit arrangement. Likewise, the spool valve member 37 has the porting end 44 provided by an annular projection 68 which terminates at a closed end 69 and one or more openings or slots 71 are provided into it.

In addition, the valve member 36 carries a flat surfaced annular ridge 72 which serves to limit the movement of it towards the outlet 18. Similarly, the valve member 37 has a flat annular ridge 73 which performs the same function relative to its movement towards the valve member 36. The annular projection 54 of the valve 36 is sized to receive in telescoping relationship the annular projection 68 of the valve 37. Whenever these valves in closed position are fully telescoped together, the flat end 69 of the valve 37 is limited in its entrance by the ridge 73 becoming seated upon the flat surface 56 of the valve 36. As these valves telescope, a metal-to-metal closure occurs until the ultimate fluid tight seal is formed between ring 58 engaging the end 69 of the valve member 37. This function closes the inlet port 23.

With the valves 36 and 37 separated as is shown in the drawings, fluid can pass from the inlet port 23 through the slots 71 into the passageway 38 and exit through the outlet 18 to the downstream device being controlled.

However, the valve members have closed inlet ports 21 and 26.

The valve 36 is arranged to cooperate with the housing 16 in much the same manner as with the valve 37. More particularly, the annular projection 64 is received within the passageway 33 formed in the housing 16. The annular ridge 72 seats upon a flat surface 74 formed in the housing 16. This flat surface 74 carries an annular dovetailed groove 76 in which is positioned an annular resilient sealing ring 77. Thus, as the cylindrical surfaces between the annular projection 42 and passage 33 telescope within each other, first the slots 67 are sealed off forming a metal-to-metal closure. Then, the ridge 72 seats upon the flat surface 74 with the ultimate fluid tight seal being formed by the sealing ring 76. This function closes inlet port 21.

In a like arrangement, the housing 17 carries a removable spool 81 which may have a flanged type head 82 secured in place within the passageway 32 by a snap ring 83. The spool 81 has a cylindrical projection 84 that is received (forming a metal-to-metal seal) within the annular sealing projection 59 of the spool valve member 37. A flat ridge surface 86 is carried by the spool 81 and provides a metal-to-metal abuttment to the end surface 61 on the valve member 37. Then, a fluid tight sealing engagement occurs with the resilient seal 63 carried by the valve member 37. This function closes the inlet port 26. The spool 81 has a flat end 87 into which are formed openings or slots 88 in exactly the same manner as the openings or slots 67 and 71 formed in the valve members 36 and 37.

Thus, the valve member 37 in the position shown in the drawings, is sealed fluid tightly to the spool 81 and no fluid can pass from the inlet port 26 into the passageway 32. Likewise, with the valve member 36 in the position shown in the drawings, a fluid tight seal is formed between the resilient seal 77 and the flat ridge 72 and therefore no fluid can pass from the inlet fluid port 21 to the passageway 38. If the valve members 36 and 37 are telescoped together whereby a fluid tight seal is formed between the annular sealing ring 58 and the flat ridge 73, no fluid could pass from the inlet port 23 into the passage 38 for transmission to the outlet 18.

With this arrangement, it will be apparent that the shuttle valve assembly 11 operates in the following manner relative to receiving input fluid signals which may be high pressure, hydraulic fluid applied selectively through the various inlet ports. The valve members are so constructed with working surfaces exposed to hydraulic fluid from the inlets 21 or 26 so that the valve members 36 and 37 can be nested together and moved in unison towards either the outlet 18 or the closed end housing 17 as desired with the fluid signal reacting the outlet 18. Likewise, the valve members 36 and 37 can be separated from one another and one of them moved to permit hydraulic fluid to flow from the inlet 23 to the outlet 18.

Assuming that the position of the valve members 36 and 37 are as shown in the drawing, the shuttle valve assembly 11 operates in the following manner. The valve members have closed inlet ports 21 and 26 against fluid flow into the passage 38 and only the inlet port 23 is open to permit fluid flow through slots 71 into the passageway 38 for transmission to the outlet 18. Now, a primary fluid signal (e.g. 1000 psi) is applied at the inlet port 21. This fluid pressure acts upon the valve member 36 so as to move it against valve member 37 and towards the closed end housing 17. This movement continues until the valve members are in their most forward position with the flat end 61 of the valve member 37 engaging the ridge 86 on the spool 81. The valve member 36 seats against the valve member 37 and closes off the inlet port 23. The primary fluid signal passes through the openings or slots 67 to enter the passageway 38 for transmission to the opening 18. If a like pressure were to be applied at either inlet 23 or 26, the valve members would not be moved from this position. However, if a superior fluid signal (e.g. 1800 psi) to the primary signal at the port 21 is applied at the port 23, the valve member 36 will be separated from the valve member 37 and shifted by the differential hydraulic pressure to the position shown in the drawings. As a result, the valve member 36 now blocks off the inlet port 21 but the superior fluid signal passes from the inlet port 23 through the openings or slots 71 into the passageway 38 and to the outlet 18. Similarly, if a superior hydraulic fluid signal (e.g. 2000 psi) is applied to the port 26, and this fluid signal is superior to the fluid signal at the inlet ports 21 or 23, the valve member 37 shifts away from the spool 81 and telescopes into the valve member 36 thereby first closing the port 23. Then, completed movement of the valve member 37 forms a fluid tight seat by the seating of the flat end 56 upon the ridge 73 with the ultimate fluid seal being provided by the annular resilient seal 57. At this time, the hydraulic fluid signal passes from the inlet port 26 through the passageway 32 and slots 88 into the passageways 39, 38 and then outflows through the outlet 18 to the downstream unit being controlled.

With this arrangement, it will be apparent that the primary hydraulic fluid signal applied at the inlet port 21 or a superior hydraulic fluid signal applied at the port 23 will provide the usual control functions such as applied through the two input signal type of control systems at the rig floor, and results in a proper fluid signal being passed through the outlet 18 of the valve assembly 11 to the downstream device being controlled. In an emergency or for other reasons, a superior hydraulic fluid signal can be applied to the inlet port 26. As an immediate result, the valve members 36 and 37 shift to block inlets 21 and 23, and this signal passes through slots 88 into the passageways and to outlet 18. This superior fluid signal at inlet port 26 can be hydraulic pressure released from the automatic acoustic control system at the sub sea wellhead or it can be supplied through a manual control actuated subsea or by rig controls.

The housings are preferably manufactured as discs from a suitable steel or alloy resistant to corrosion and capable of withstanding the hydraulic fluid pressure forces exerted upon them. The housings may be provided with axial openings 91 spaced uniformly therethrough to receive elongated cap bolts 92 that extend from an exposed head 93 to a threaded portion 94 that is received within the housing 16. A lock washer 96 may be carried under each of the heads 93 to prevent the bolts from working loose due to vibration or temperature excursions. The housing 13 preferably has annular overlapping and underlapping portions or projections 97 and 98, respectively, at its ends. The portion 97 is seated against a flat surface 99 which is provided upon the housing 16. Preferably, there is an annular space 101 provided beneath the portion 97 in which is accommodated a resilient sealing ring 102 and which provides a fluid seal between the housings 13 and 16. In like arrangement, the housing 18 has overlapping and underlapping projections 103 and 104, respectively. The overlapping projection 103 is spaced a slight distance from the underlapping projection 98 of the housing 13 to provide a space 106 in which is accommodated an annular resilient sealing ring 107. The end of the projection 103 abutts against a flat end surface 108 upon the housing 13. The seal 107 provides a fluid tight connection between the housings 13 and 14. Also in a similar arrangement, the housing 17 carries an overlapping projection 109 which is seated against a flat surface 111 carried upon the housing 14. The overlapping projection 109 is spaced away from the underlying projection 104 of the housing 14 so as leave an annular space 112 between them and an annular resilient seal 113 in this space provides a fluid tight seal between the housings 14 and 17.

With the preceedingly described arrangement, it will be apparent that more cooperating pairs of housings and valve members can be added to the stack shown in the drawings. For example, if it is desired that the shuttle valve assembly 11 carry four input ports, then an additional housing and spool valve member are added between the housings 16 and 17 and secured in place by the bolts 92. Thus, it will be apparent by the use of identical nested housings and spool valve members, that the spool shuttle valve assembly 11 can be arranged to provide any desired number of inputs for receiving input fluid signals for controlling hydraulic fluid output through the output 18 from the body 12.

The arrangement of the spool valve members is shown as being "closed centered" so that as the valve members telescope together a metal-to-metal fluid seal is first formed before the ultimate fluid tight seal is obtained. However, the openings or slots such as 67, 71 or 88 can be machined greater in axial dimension to provide a "open centered" type of shuttle valve assembly wherein the resilient seals above form the fluid seal. In addition, it is preferred that the present shuttle valve assembly 11 be constructed with the body 12 formed of stainless steel or like corrosion resistant alloys and the shuttle valve members be formed of naval bronze so that different metals are present between the two groups of sliding elements in the present shuttle valve assembly.

If desired, the present shuttle valve assembly 11 can be made into or arranged for control interlocking. For this purpose, an auxillary port 114 can be provided in the housing 16 with fluid communication to the outlet 18. Generally, the port 114 can be closed with a fluid tight threaded plug 116. For control interlocking function for the shuttle valve assembly, a hydraulic fluid signal connection can be made to an input of another function shuttle valve. Thus, once the valve is actuated, this interlock pressure from the outlet 18 to the inlet port on the second valve will keep both valve functions interlocked.

An additional advantage arrives through the use of a symmetrical construction for the several housings in that the housings can be rotated relative to one another to selectively index the openings 91 therethrough and then installation of the bolts 92 can be made. With this arrangement, the positioning of the various inlet ports can be made at a desired radial distribution about the shuttle valve assembly. Of additional advantages, the function of the nested spool valve members preserve the closing of the inlet port through which the actuating or hydraulic fluid signal is not being applied. In addition, because of the arrangement of the spool valve member, the input signal can be hydraulic fluid under a pressure of less than 50 psi or it can be at maximum working pressure of 5000 psi. In either event, the operation through the shifting of one or more of the spool valve members is very rapid and results in absolute application of that superior control pressure from its inlet port through the passageway of the shifted spool valve members to the outlet 18 of the shuttle valve assembly 11.

From the foregoing, it can be seen that the novel shuttle valve assembly 11 employs a modular approach through the use of identical nested housings and spool valve members so that after the first input signal handling capability, each additional signal input handling capability only requires the adding of a nested housing and accompanying shuttle valve member to provide such additional input capability. As a result, the shuttle valve assembly of this invention is of a smaller size, with selective input port orientation for any desired number of input fluid signal capabilities with ready disassembly for ease of maintenance and low cost through the use of identical interchangeable components. Other advantages of the present shuttle valve assembly will be apparent from a study of the preceeding discription of its construction and operation.

From the foregoing, it will be apparent that there has been provided a novel shuttle valve assembly for convenient construction and safe operation at remote locations such as upon a sub sea well template for use in controlling stacked blowout preventors by remote signals from a rig floor or by hydraulic signals from a sub sea acoustic control system. It will be appreciated that certain changes or alterations in the present valve assembly may be made without departing from the spirit of this invention. These changes are contemplated by and are within the scope of the present claims which define the invention. Additionally, the present description is intended to be taken as an illustration of this invention.

What is claimed is:

1. A shuttle valve assembly comprising:

(a) A body having a plurality of nested housings, an outlet end housing having a fluid signal outlet and a closed end housing, and means for securing said housings into an integral structure;

(b) said housings having an aligned axial cylindrical passageway;

(c) a plurality of spool valve members with an axial passageway opening into said outlet, said valve members mounted within said cylindrical passageway and adapted to move axially between opened and closed positions therein, individually and in a nested arrangement for controlling flows between said inlet ports and said cylindrical passageway;

(d) each said housing having an inlet signal port in communication with said cylindrical passageway;

(e) said valve members moved into nested arrangement towards said closed end housing by a primary fluid signal applied at said inlet port on said closed end housing whereby the primary signal passes through one of said valve members in an open position to said outlet;

(f) each said valve member separated from said valve member next closest to said closed end housing by a superior fluid signal applied to said inlet signal port in said nested housing containing said valve member being separated into an open position whereby this superior signal appears at said outlet; and (g) said valve members moved into nested arrangement towards said outlet end housing by a superior fluid signal applied to said inlet signal port in said closed end housing whereby this superior fluid signal passes through another of said valve members in an open position and appears at said outlet.

2. The shuttle valve assembly of claim 1 wherein each of said valve members has a sealing end and a porting end, and the sealing end of one valve member cooperating with the porting end of the adjacent valve member in the nested arrangement between said opened and closed positions.

3. The valve assembly of claim 1 wherein said valve members have identical construction.

4. The valve assembly of claim 1 wherein said nested housings have identical constructions.

5. The valve assembly of claim 1 wherein each said nested housing has a cylindrical configured axial passageway, and each said spool valve member has a cylindrical body adapted to slide in said passageway in fluid tight sealing engagement, said sealing end formed by a flat ended annular projection at one end of said valve member and said porting end formed by a perforated annular projection with openings therein at the other end of said valve member.

6. The valve assembly of claim 5 wherein said flat ended projection of one said valve member telescoping about said perforated annular projection on another of said valve members.

7. The valve assembly of claim 6 wherein each said valve member carries a flat annular ridge between said cylindrical body and said perforated annular projection whereby said flat end projection of one said valve member seats against said flat annular ridge on another of said valve members thereby providing a fluid seal between said valve members in nested arrangement.

8. The valve assembly of claim 7 wherein an annular resilient sealing ring is carried in an annular groove formed within said flat end projection on each said valve member.

9. The valve assembly of claim 5 wherein an annular resilient sealing ring is carried in an annular groove formed within said cylindrical body on each said valve member for sealing fluid tightly in sliding engagement to said cylindrical passageway in said nested housing carrying same.

10. The valve assembly of claim 5 wherein said outlet end housing has said cylindrical passageway surrounded by a fluid tight sealing means and adapted to receive said flat ended annular projection of said valve member adjacent thereto.

11. The valve assembly of claim 5 wherein said closed end housing includes an end spool with a cylidrical projection including a flat annular ridge whereby said flat ended projection on said valve member adjacent thereto is received on said cylindrical projection to provide a fluid tight seal therebetween.

12. A shuttle valve assembly comprising a body having a plurality of nested housings, an outlet end housing having a fluid signal outlet, and a closed end housing, and means for securing said housings into an integrated structure;

(a) said housings having an aligned axial cylindrical passageway;

(b) each said nested housing comprising a metal disc having an aligned axial cylindrical passageway, an inlet fluid signal port in said disc opening into said passageway, annular overlapping and underlapping projections on opposite ends of said disc and said projections adapted to receive annular sealing rings therebetween whereby said nested housings can be interfitted by said underlapping projection of one disc received within said overlapping projection of another disc with said sealing rings providing a fluid tight interconnection therebetween;

(c) a plurality of spool valve members mounted within said cylindrical passageway of said nested housings and adapted to move axially between opened and closed positions therein, individually and in nested arrangement for controlling flows between said inlet ports and said cylindrical passageway;

(d) each said spool valve member provided with an axial stepped cylindrical passageway opening into said outlet and having a cylindrical body carrying a peripheral resilient sealing ring in an annular groove, said sealing ring providing a sliding fluid seal to said cylindrical passageway of said nested housings, said body having a flat ended annular projection at one end and a perforated annular projection at its other end; said cylindrical body having a flat annular ridge adjacent said flat ended projection, said flat ended projection having said stepped cylindrical passageway of a size to receive in telescoped relationship said perforated annular projection on an adjacent valve member, and said flat ended projection having a length to seat fluid tightly against said flat annular ridge on said adjacent valve member;

(e) said outlet end housing having said cylindrical passageway of a size to receive said perforated annular projection on said valve member and having a resilient sealing ring means;

(f) said closed end housing mounting an end spool with a cylindrical projection including a flat annular ridge whereby said flat ended projection on said valve member adjacent thereto is received on said cylindrical projection in a fluid tight sealing relationship;

(g) said valve members moved into nested arrangement towards said closed end housing by a primary fluid signal applied at said inlet port on said closed end housing whereby the primary signal passes through said cylindrical passageway in said valve member in opened position to said outlet;

(h) each said valve member separated from said valve member next closer to said closed end housing by a superior fluid signal applied to said inlet signal port in said nested housing containing said valve member to be separated into opened positioned whereby this superior signal appears through said cylindrical passageway at said outlet end housing; and (i) said valve members moved into nested arrangement towards said outlet end housing by a superior fluid signal applied to said signal inlet port in said closed end housing whereby this superior fluid signal passes through another of said valve members in an opened position into said stepped cylindrical passageway of said valve members and flows to said outlet in said outlet end housing.

13. The valve assembly of claim 12 wherein the openings in said perforated annular projection on each said valve member are arranged to be closed by telescoping within the adjacent valve member before said valve member moves into its ultimate closed position.

14. The valve assembly of claim 12 wherein the openings in said perforated annular projection on each said valve member are arranged to be slightly open during telescoping within the adjacent valve member before said valve member moves into its ultimate closed position.

* * * * *